May 30, 1950 — W. F. VAN LOENEN — 2,509,710
INCENDIARY
Filed July 1, 1943 — 3 Sheets-Sheet 1
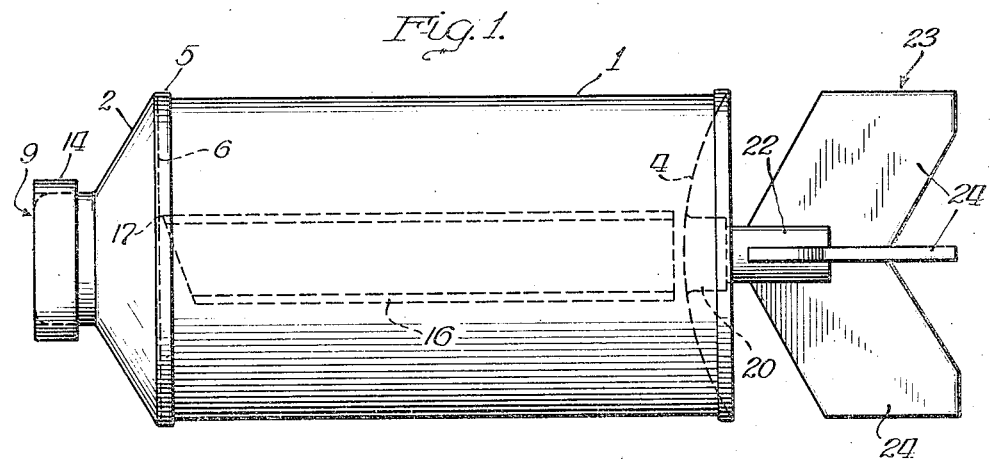
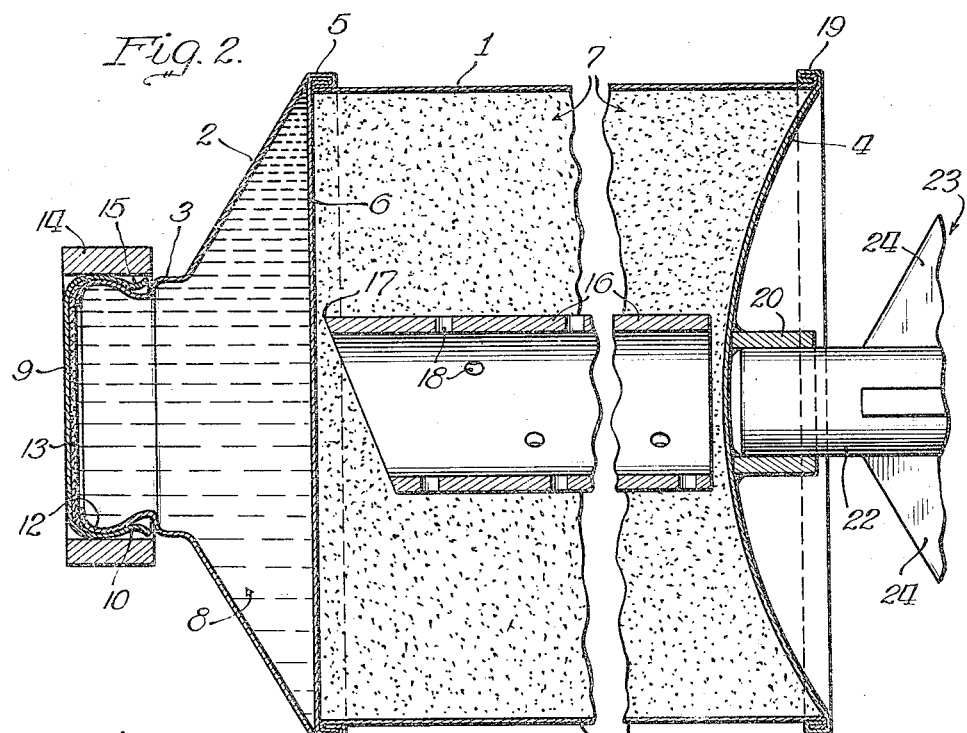
INVENTOR.
William Frederick Van Loenen
BY
Attys.

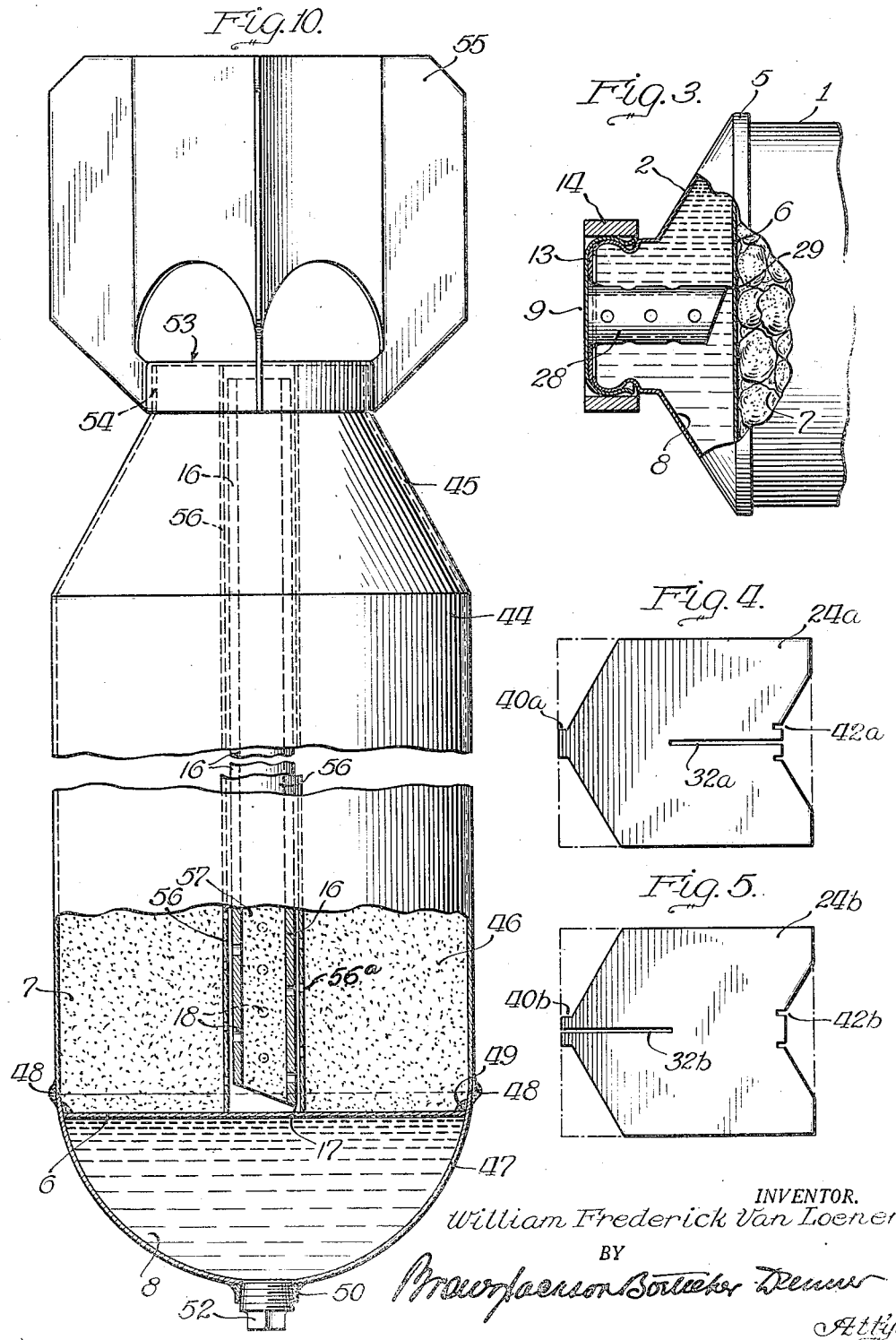

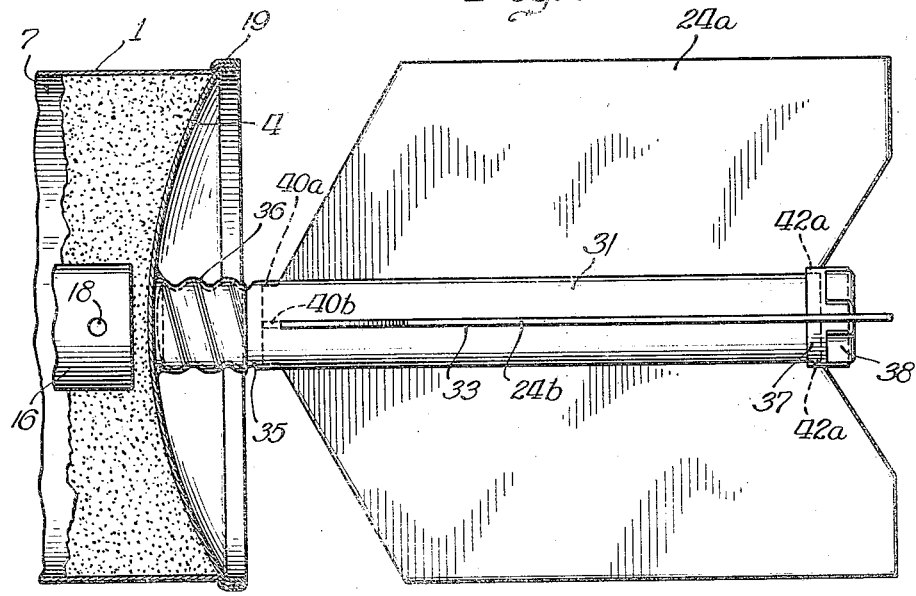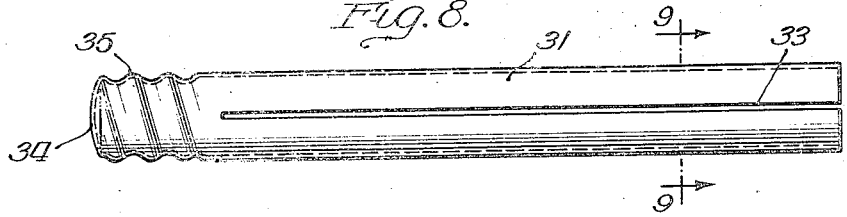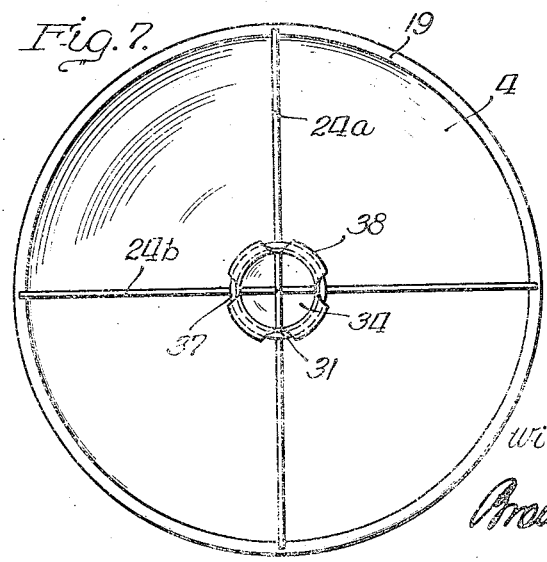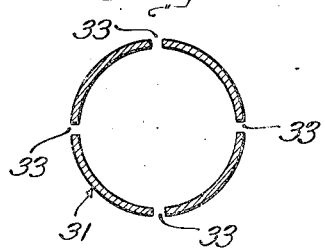

Patented May 30, 1950

2,509,710

UNITED STATES PATENT OFFICE 2,509,710

INCENDIARY

William Frederick Van Loenen, Los Altos, Calif., assignor to Kaiser Aluminum & Chemical Corporation, a corporation of Delaware Application July 1, 1943, Serial No. 492,989

7 Claims. (Cl. 102—6)

My invention relates to incendiaries and while the preferred form of the invention is particularly well adapted to incendiaries of the bomb type such as are intended to be dropped from aircraft, the invention is not limited to that particular service, but may be embodied in devices for a wide variety of services.

In the production of magnesium metal from magnesium oxide by carbothermic reduction according to the process disclosed in Patent No. 1,884,993 (Hansgirg), a mixture of magnesium oxide and carbon is converted into magnesium vapor and carbon monoxide by the heat of an electric arc furnace. This gaseous mixture is discharged from the region of the arc at a high enough temperature (above 1800° C.) that reversal of the reaction does not occur, and is then suddenly cooled and diluted by injecting large volumes of a shock chilling agent, which may be hydrogen, natural gas, hydrocarbon vapor or even a spray of liquid hydrocarbon. In a particular practice of the process with which I am familiar, natural gas is employed. The magnesium vapor is condensed to magnesium metal in the form of extremely fine dust. Some of the vapor recombines with carbon monoxide with the result that the solid material precipitated in the condensing chamber comprises a substantial proportion from 30 to 60% of magnesium dust with the remaining 70 to 40% comprising carbon, magnesium oxide and other impurities. A typical sample of a normal run shows 47% by weight of magnesium metal dust. A condensate so recovered in the carbothermic process and of the composition indicated above, is conveniently known as carbothermic magnesium dust and is so designated in the claims.

This precipitate, i. e., the magnesium dust with admixed impurities, while it requires coalescing of the magnesium dust to produce compact metal, is, nevertheless, highly pyrophoric, and will combust spontaneously when exposed to the atmosphere. To diminish this tendency so that the material may be safely handled for sublimation into crystalline magnesium metal, it is now customary to wet the precipitate with a light hydrocarbon oil having a flash point above 100° F., with or without a small amount of asphalt to produce a relatively stiff plastic mass known in the art as carbothermic magnesium paste. The asphalt is added when it is desired to make the mass somewhat cohesive, particularly where it is desired to tablet the material into compact pellets or briquettes. Where the shock chilling is produced by oil spray the shock chilling oil residue wets the precipitate and inhibits ignition.

I have observed that while this carbothermic magnesium paste, i. e. carbothermic magnesium dust and impurities wet with oil and with or without asphalt or other binder is not spontaneously reactive with dry air, water vapor or spray will ignite it. From this chance observation, I conceived that an inexpensive incendiary might be constituted from the simple ingredients of carbothermic magnesium paste and water. Trial of the reactive effect of water and carbothermic magnesium paste confirmed the theory.

The construction of well known incendiaries, particularly those of the known "stick" form, involves the use of cast solid magnesium metal which is difficult to ignite except by thermite or a similar igniting charge. Incendiaries and flares of magnesium powder have therefore been made by first producing magnesium in solid metal form and then subdividing it. By my method the raw powder coming from the shock chilling step of the carbothermic process may be directly substituted for the far more expensive method at present utilized. Also, the metal in its dry dust form in the carbothermic magnesium paste is of a state of subdivision far greater than that which it is practicable to produce by mechanical subdivision.

According to my invention the magnesium powder even in the impure form as recovered from the vapor produced by carbothermic reduction, and with or without other materials, may be directly applied to incendiary use without going through the stage of first producing the coalesced or solid metal. A great advantage of using such a finely divided metal is that the desired ignition may be secured from mere contact with such simple media as air and water. Any substance which gives up oxygen freely enough to produce ignition, i. e., rapid combustion, may be used.

The finely divided magnesium produced in the carbothermic process has a particle size of substantially less than one micron, and as heretofore stated is capable of spontaneous combustion with the atmosphere unless wetted down with a material such as hydrocarbon oil. It is obvious that a particle size on the order of that mentioned cannot be achieved on a commercial scale by use of mechanical means. The fine particles, because of their pyrophoric qualities, would present a considerable fire hazard if mechanically produced, and the high cost and complicated equipment necessary to mechanically produce such particles in an inert atmosphere would be impractical. Thus additional advantages of this invention are that it utilizes an incendiary material of finely divided magnesium of a particle size never before attainable on a commercial scale, and yet such finely divided magnesium is capable of rapid and economic production, and can be safely handled.

The carbothermic magnesium paste may be used as a loose mass, a paste, or it may consist of compacted or tabletted pellets or briquettes. Magnesium in the form of solid metal either as a part or all of the container, or as an admix in the form of borings, turnings, screenings, or pieces of scrap metal, may be used in conjunction with the carbothermic magnesium paste and may partake of the incendiary reaction, after the same is initiated.

It is to be understood that after the carbothermic magnesium paste is once ignited, it will continue to burn by reaction with the oxygen and/or nitrogen of the air, and tends by the heat and flame produced to ignite adjacent combustibles. Water applied to extinguish it is of no use as it reacts readily with the magnesium, accelerating combustion.

Additional reagents which tend to sustain combustion of the magnesium powder, such as ferric oxide, barium oxide and other similar metal oxides, potassium chlorate, sodium nitrate, and other similar metallic salts containing oxygen, sulfur, gasoline or carbon, and mixtures thereof, may be added to the finely divided magnesium powder, and after ignition is instituted as by the liquid oxidizing agent, the further combustion may be sustained or aided by such reagents. Where a liquid, such as water, is employed to produce ignition, the resulting gas, such as hydrogen, is combustible and tends to spread the fire. Similarly, liquids which by deoxidation by the finely divided magnesium produce combustible gases, tend also to spread the fire by producing a flame reaching into adjacent space for oxygen to support its combustion.

If it is desired to ignite the magnesium powder in a body of water, or under similar conditions, particularly where it is desired to ignite an oil slick on a body of water, it is advantageous to add an agent which will cause heat and/or gas generation, such as quicklime and/or carbides. The addition of carbides to the finely divided magnesium powder is particularly advantageous due to their gas generating properties, because the pressure generated causes the casing containing the incendiary material to burst more rapidly than under conditions wherein the incendiary material does not contain carbides, with consequent dispersion of the incendiary charge over the adjacent area in a very effective manner.

In addition to the fundamental concept of producing incendiary combustion by rapid oxidation of finely divided or powdered magnesium or carbothermic magnesium paste with air and water or the like, I have conceived and produced a simple and effective structural arrangement for carrying in effective association the solid incendiary material and the liquid oxidizing agent, and for projecting them into the desired contact upon delivery of the bomb upon the target in the intended manner.

According to the preferred embodiment of this phase of the invention, an elongated generally tubular casing is divided into two chambers by an imperforate dividing wall. The foremost, or nose chamber, which is preferably collapsible, is designed to be filled with the liquid oxidizing agent. This may be done if desired at the point of use for purposes of safety and ease and economy of handling. The second chamber occupies the major part of the casing, and provides room for stowing the charge of incendiary material, such as carbothermic magnesium paste with or without other material. A guiding tail vane attached to the rear of the casing is designed to insure that the bomb will strike the nose chamber against the target.

A punch member may be relied upon to rupture the dividing wall upon impact. This punch may be actuated by the collapse or displacement of the nose chamber to thrust itself back through the separating wall. Alternatively, the inertia of a punch disposed above the wall may be relied upon to plunge it forward through the wall upon the bomb striking the target. In either event, the punch or striker breaks down the wall, and at the same time the liquid is dispersed into the body of incendiary material through one or more ducts which allow the liquid to be brought into a fairly extensive area of contact with the incendiary charge. Hydraulic pressure generated in the nose by impact assists in rupturing the dividing wall and subsequent dispersion of the liquid.

The impact punch may consist of a tubular member with perforated side walls, this punch being disposed in a duct or passageway formed in the incendiary mass.

While plain water is the simplest liquid oxidizing agent, there may be situations or conditions of use calling for the addition of antifreeze agents or of liquids which will withstand low temperatures without solidification. Thus alcohols, aldehydes and organic acids may be employed. Also inorganic compounds such as chlorates, permanganates, particularly of the alkali metals, may be dissolved in the liquid or associated therewith. Wetting agents to accelerate the wetting of the incendiary material with the liquid may be used.

While the preferred form of the invention is an incendiary adapted to be automatically ignited by impact of the bomb upon the target, it will be appreciated that the incendiary may be constructed for operation mechanically as for "booby trap" or hand grenade use or for remote control operation.

An advantage of the bomb of my invention is that no fine adjustments or delicate parts are involved in the production of a very effective and simple structure. The liquid oxidizing agent may be added at any time prior to use. Thus the bomb may be constructed and transported to the area of use without premature ignition.

The feature of forcing the oxidizing agent into contact with the mass of incendiary by rupture of the dividing wall upon impact without bursting the casing, is highly advantageous for an aerial bomb because it permits the bomb to penetrate a structure before bursting from internal pressure.

Now in order to acquaint those skilled in the art with the manner of constructing and utilizing my invention, I shall disclose in conjunction with the accompanying drawings a specific embodiment of the same.

In the accompanying drawings:

Figure 1 is a side elevational view of an incendiary bomb embodying my invention;

Figure 2 is a longitudinal axial section of the bomb shown in Figure 1;

Figure 3 is a fragmentary side view, with parts broken away, to show a modified form of punch;

Figures 4 and 5 are side elevational views of the wings of the tail vane assembly;

Figure 6 is a side view of a modified form of tail vane assembly and means for attaching the same to the casing of the bomb;

Figure 7 is a rear end view of the tail vane and assembly of Figure 6;

Figure 8 is a side elevational view of the stem of the tail vane assembly;

Figure 9 is a section taken on the line 9—9 of Figure 8;

Figure 10 is a side elevational view, partly in section, of a bomb of relatively large dimensions and containing additional gas generating means;

Figure 11 is a cross sectional view of a modified form of separating wall or diaphragm; and Figure 12 is a further modified form of wall or diaphragm.

Referring first to Figures 1 and 2, the bomb herein shown comprises a cylindrical sheet metal body, portion 1 having a conical top, portion 2 terminating in a neck 3. Some of my initial trials were made utilizing beer cans for the body of the container, and the container here shown is of that type of construction. The cylindrical sheet metal body 1 is closed at the rear by a dished head 4. The cylindrical wall 1, and the conical top wall 2, have their adjacent margins beaded together at the bead 5, which includes also the margins of the diaphragm 6. The diaphragm 6 divides the space in the sheet metal body into two compartments, namely, the incendiary compartment 7 and the liquid compartment 8. In alternative arrangements the diaphragm may be fixed in position by soldering, welding or otherwise.

The neck of the liquid compartment 8 is grooved and formed to receive and be sealed by a metal cap 9 which is pressed and/or crimped at 10 and 15 upon the head 12. The cap 9 may be a bottle cap of the so-called "Crown" type, which contains an interior sealing disc 13 for producing a non-leaking seal between the cap and the end surface of the head 12 of the bottle neck 3. A metal cap retainer sleeve 14 may be forced over or shrunk upon the periphery of the cap to prevent accidental release of the cap, particularly upon impact. The water compartment 8 is adapted to contain water or other oxidizing liquid, as will be described later, but preferably this compartment or chamber is left unfilled until the bomb is brought near the place of use.

The compartment, or chamber 7, is adapted to contain the above described magnesium dust; that is, magnesium precipitated from the vapor form in the process of shock chilling along with concomitant impurities. This magnesium dust and impurities may be in the form of loose dust or in the form of a mass of carbothermic magnesium paste, or it may be compacted in the form of pellets or briquettes substantially filling the chamber 7 outside of the tubular punch member 16 which is disposed substantially axially of the bomb. The magnesium filling may include scrap magnesium, such as turnings, borings, screenings, broken-up pieces, etc., which become ignited by the burning of the powdered magnesium. The punch 16 consists of a short length of steel tubing cut off on a plane at an angle to the longitudinal axis of the tube so as to provide a sharp curved cutting edge 17 of exceptional efficiency for cutting through the wall or diaphragm 6 by endwise motion of the tube 16 relative to the said diaphragm 6.

In one form of the device which I have constructed, the body of the bomb is of about the size and shape of a conventional beer can, and in that form the tubular punch 16 is a piece of ¾-inch, outside diameter, steel tubing. The form of the punch may be varied. The tubular punch 16 is preferably provided with a series of perforations 18 through its side walls so that liquid which may be discharged into the interior of the tube 16 may be distributed throughout the mass of the incendiary material inside the compartment 7. The punch should be of a stiff rod-like piece of metal so that its inertia will produce a punching effect on the diaphragm.

The incendiary material and the punch 16 may be disposed in the can and then the head 4 may be disposed over the rear end of the cylindrical body 1, and the head and cylindrical walls joined as by means of the bead 19.

Alternatively, the head 4 may have a closable opening through which the filling of magnesium and the punch 16 may be inserted, and then the opening closed. In the form shown the socket 20 for the stem 22 of the tail vane 23 is mounted centrally of the head 4, being brazed or soldered thereto. The stem 22 of the tail vane assembly which bears the four radiating vanes 24, 24 is secured in the socket 20 by a cotter pin, or it may be secured by screw threads, brazing, or any other suitable manner.

The tubular punch 16 is adapted to pierce the diaphragm 6 by inertia. The incendiary charge is disposed around the tubular punch 16 inside the cylindrical compartment 7, and prior to use of the bomb the liquid compartment 8 is filled with water. Alternatively, any other suitable oxidizing liquid such as various alcohols, aldehydes and organic acids containing oxygen may be used. The water may have dissolved therein various substances for various purposes. For example, the water may contain a suitable liquid for anti-freeze purposes. The salt or liquid, furthermore, may contain substantial proportions of oxygen.

In use the bomb body containing the incendiary in the chamber 7 and the inertia punch 16 in place is shipped to the place of use without the water filling. The water or other liquid which it is desired to use is charged into the liquid chamber 8 and the said chamber is sealed off as by means of the cap 9 or other preferred closure means. When the bomb is dropped or projected through the air the tail vanes direct the bomb forward so that it will drop on its nose, that is, striking the cap 9 against the target. When the bomb strikes on its nose the inertia of the bomb and all its parts tends to collapse the liquid-containing chamber 8. At the same time the punch 16 being restrained but slightly by its contact with the filling of magnesium bearing material, drives by inertia toward the diaphragm 6, and pierces the same by the sharp point 17, cutting a hole through the diaphragm. The forward pressure of the inertia punch 16 and the pressure to the rear of the liquid contained in the collapsing or deforming liquid chamber will cut and tend to force back a flap of metal of the diaphragm 6 into the bore of the tube 16 and to discharge the contents of the liquid chamber 8 into the said tube 16. From there the water or other liquid is charged through the holes 18 and the end of the tube 16 into free contact with the incendiary magnesium powder. The reaction of water with magnesium powder produces hydrogen, which generates pressure sufficient to burst the container. The heat generated by the reaction assists in the ignition of the charge. When the container is burst the magnesium powder is then exposed to the oxygen of the air, which carries to completion the incendiary reaction so initiated.

If no provision is made for opening of the casing, aside from the internal rupture between the two compartments, the internal pressure generated will tend to blow the can open, usually with sufficient violence to scatter the burning charge over the surrounding area. Obviously, explosive means may be embodied in the charge of the bomb to produce an explosion independently of the pressure generated from the reaction of the water and magnesium dust. Also, additional gas generating means may be provided, such, for instance, as carbides. The magnesium powder itself may include more or less magnesium carbide.

Since it is of advantage to have the generated steam and hydrogen pressure disrupt or burst the can or container, the cap 9 should be retained firmly in place and the further advantage of the cap retaining ring 14 will now be apparent.

Rupture of the diaphragm 6 to permit the water to be forced by collapse of the water compartment 8 over into the magnesium containing compartment 7 may be produced in various ways. For example, the internal liquid pressure created by the bomb striking upon its nose and collapsing the water compartment 8 may be employed to rupture the diaphragm. This may be facilitated by such an expedient as one or more "knockout" portions, such as indicated at 25 in Figure 11, where a disc has been partially sheared out of the body of the diaphragm 6 to produce a line of weakness at 26 which requires not a great deal of pressure on the bottom side of the wall 6 shown in Figure 11 to produce a rupture to permit the water to pass through from the bottom side to the top side of the wall 6 as shown in Figure 11.

Also, as shown in Figure 12, a plurality of crossing or meeting cuts may be made partially through the metal, so that lines of weakness are provided. For example, two cuts crossing each other at the point 27 extending partially through the wall of the diaphragm 6 may provide satisfactory means in conjunction with the hydraulic pressure generated in the chamber 8 when the incendiary nose strikes the target to rupture the diaphragm 6 and drive the liquid over into contact with the incendiary material.

I consider the inertia tube as preferable because of its certainty of operation and the advantage of having the tube 16 drive toward the left as viewed in Figure 2 and the hydraulic pressure escaping to the right as viewed in Figure 2 when the bomb strikes upon a target.

As shown in the modification of the invention in Figure 3, a tubular punch member 28 attached to the cap 9 at its left end and having a cutting edge formed by a diagonal cut of the tube, produces a sharp point at 29 near the surface of the diaphragm 6. In this modification the punch 28 operates by displacement against the diaphragm 6. That is to say, when the bomb hits on its nose the cap and forward part of the water compartment 8 are displaced toward the rear end the sharp cutting edge 29 is thrust through the diaphragm 6. In this case both the edge of the punch tube 28 and the internal pressure operate in the same direction, that is, toward the right as viewed in Figure 3. Both forms of punch may be employed in a bomb if so desired.

While the internal pressure generated by the action of the water or other oxidizing liquid upon the finely divided magnesium may be depended upon to burst the shell, the shell itself may be made of magnesium, which, when heated to the ignition point, will itself burn and increase the conflagration. It is to be observed that the water which reacts with the finely divided magnesium gives off hydrogen gas which burns with an intense flame to increase the conflagration, and thereby insure complete ignition.

The presence of a charge of explosive to disrupt the can has been heretofore mentioned as a contemplated adjunct to my invention.

The tail vanes are preferably formed of two interfitting plates 24a and 24b having slots 32a and 32b which interfit, and these vanes may be set as by soldering or brazing in the stem 22, or, alternatively, a less expensive structure may be provided as shown in Figures 6 to 9. Here the two crossed plates 24a and 24b are set into a hollow tubular steel metal stem which is slotted as by two transverse cuts through the major length thereof to produce the four slots 33, 33. The inner end of the tubular member is preferably closed as at 34 and threads 35 are pressed into the side walls adjacent to the said end 34 so that this threaded stem may be threaded into a socket 36 fastened on the rear wall 4 of the incendiary bomb body 1. A cylindrical ring 37 is slipped over the four quarters of the tube 31 and then the ends of the four sections are either doubled back over the ring or pressed into an arching head structure which holds the ring 37 firmly in place on the outer cylindrical surfaces of the split tube 31. This clinching back or beading over of the quarters of the tube is indicated at 38 in Figures 6 and 7. It will be readily understood that the ring 37 at the rear end and the integral cylindrical wall at the front end keep the vanes in position. The vanes may further be provided with piloting shoulders 40a, 40b at the front end to fit inside of the tubular threaded part of the tube 31 and may be provided with notches 42a and 42b for receiving the ring or sleeve 37 at the rear end to hold the vanes firmly in position.

Bombs of any size may be built embodying the same principle of operation with or without modification. In Figure 10 I have shown an incendiary bomb suitable for sizes such as 50, 100 and 200 pound incendiary bombs or even larger. The cylindrical case 44 with a tapered conical wall 45 at the rear tapering to a filler opening is adapted to receive the incendiary material 46 which may be loose powder or carbothermic magnesium paste or pellets in the compartment 7. Compartment 7 is closed at its lower end by the rupturable diaphragm 6 which separates the incendiary compartment 7 from the water compartment 8. The particular details of welding together the parts of the shell 44 and the convex nose chamber wall 47 may be varied, but here these two parts are shown as joined on a weld 48, the diaphragm 6 having first been welded into place in the hemispherical shell 47 at the weld 49. A threaded filler neck 50 at the front end of the shell 47 is adapted to be closed by a screw plug 52 after water is charged into the water compartment 8. The conical upper end of the main body is provided with a threaded filler neck which is closed by the cap 53 having internal threads threading upon the filler neck 54 to close the magnesium compartment 7. The cap 53 carries a well known tail vane assembly 55 which may consist of a series of like stampings welded together and welded to the cap 53. Alternatively, the filler neck may be closed by a threaded plug and the cap with tail vanes attached later.

Within the magnesium compartment a longitudinal duct is provided by the tube 56 which may be of perforated metal, hard fiber, or other material which has considerable strength and tends to retain its shape sufficiently to allow free or fairly free sliding of the tubular punch member 16 within the duct provided by the said tube 56, the perforations being shown at 56a. Also, it is to be undertsood that the central tubular duct 56 may communicate with lateral ducts not shown through openings 56a in the walls of the tube 56 so as to secure a suitable dispersal of the water which is forced up through the opening in the diaphragm 6 created by the punch when the bomb strikes upon a target.

The tubular punch 16 may have a filling 57 of calcium carbide, sodium, or other materials reactive with water to generate heat with or without combustible gas. In operation, the bomb body is first filled with the charge in the magnesium chamber 7 and with other material such as calcium carbide as desired in the tube 16. These may all be charged in place and the tail fins applied. Obviously, where it is desired to avoid shipping with tail vanes attached, an inner plug may be threaded into the neck 54 and the cap 53 with the tail vane assembly attached later. The bomb body, with or without the tail fin assembly, is shipped to the point of use without having the water chamber 8 filled with its charge of liquid.

When the bomb arrives at the point of use the tail fin assembly may be attached and the plug 52 unscrewed to permit filling of the liquid chamber to the desired degree with the liquid which is suitable for the particular purpose intended. It is to be understood that the liquid compartment need not be filled completely full of liquid as an air pocket will tend to increase the resiliency and hence prolong the discharge of liquid when the water chamber is collapsed or displaced.

While I have shown the walls of the magnesium containing compartments as of thin sheet metal, it will be understood that they may be made of magnesium, which becomes a part of the incendiary charge. It is also to be understood that the nose of the bomb may be made of heavy metal to increase the penetrating ability of the bomb, in which case the inertia of the charge and/or the tubular member will rupture the diaphragm.

It is also to be understood that the incendiary employed in this invention may be used as an ingredient in the charge of conventional types of incendiaries, ignited with high explosives, thermite and similar expedients. The finely divided magnesium powder is particularly advantageous in the conventional types of magnesium incendiary bombs wherein it is desired to decrease the quantity of solid magnesium metal used in the bomb.

Also, it is to be understood that instead of a single compartment containing the magnesium in finely powdered form, a number of such compartments may be employed. Likewise, more than a single water chamber may be utilized. Numerous modifications will suggest themselves to those skilled in the art. I do not intend to be limited to the details shown and described except as they are specifically relied upon in the appended claims.

I claim:

1. An incendiary comprising an elongated shell having a guiding vane at the rear thereof, and having a collapsible liquid compartment in the nose thereof, said compartment being adapted to be filled with a liquid reactive with finely divided magnesium to ignite the same, and a magnesium compartment in the body of the shell, a charge of pyrophoric material in said latter compartment, said material comprising carbothermic magnesium dust wetted with hydrocarbon, and an elongated hollow punch having perforated sidewalls disposed in and longitudinally of said shell and adapted to rupture the dividing wall between said compartments upon impact of the incendiary with a target.

2. The incendiary of claim 1 wherein the hollow punch is carried in the second compartment and is charged with calcium carbide.

3. The incendiary of claim 1 wherein the punch is driven back through the dividing wall by displacement of the front wall of the first chamber.

4. An incendiary comprising an elongated tubular shell with a guiding vane at the rear end and a transverse imperforate dividing wall adjacent to its front end dividing the shell into a nose compartment for liquid and a main compartment for incendiary solid material, a central tubular guide in the main compartment, and a hollow impact punch having perforated sidewalls disposed in said guide and adapted to rupture said dividing wall upon impact of said incendiary upon a target.

5. The incendiary of claim 4 having water in the nose compartment, carbothermic magnesium dust wetted with hydrocarbon in the incendiary compartment and carbide in the hollow impact punch.

6. An incendiary comprising a collapsible compartment for liquid in the nose thereof and an adjacent compartment for pyrophoric material, said compartments being sealed off from each other by a rupturable wall, impact means for rupturing said wall, a charge of liquid oxidizing agent in said nose compartment, a charge of carbothermic magnesium dust in said adjacent compartment reactive with said liquid oxidizing agent upon contact therewith to produce combustion, and a duct disposed lengthwise of said adjacent compartment for distributing the liquid along the charge of pyrophoric material.

7. An incendiary comprising a collapsible compartment for liquid in the nose thereof and an adjacent compartment for pyrophoric magnesium metal material, said compartments being sealed off from each other by a rupturable wall, impact means for rupturing said wall, a charge of liquid oxidizing agent in said nose compartment, a charge of carbothermic magnesium dust in said adjacent compartment reactive with said liquid oxidizing agent upon contact therewith to produce combustion and having a duct longitudinally thereof, and said impact means comprising an elongated perforated tube slidable in said duct to strike said rupturable wall upon impact of the incendiary with a target.

WILLIAM FREDERICK VAN LOENEN.

REFERENCES CITED

The following references are of record in the file of this patent:

UNITED STATES PATENTS

| Number | Name | Date |
|---|---|---|
| 1,333,786 | Thomas | Mar. 16, 1920 |
| 1,884,993 | Hansgirg | Oct. 25, 1932 |
| 2,088,204 | Hansgirg | July 27, 1937 |
| 2,101,904 | Hansgirg | Dec. 14, 1937 |
| 2,149,694 | Vollrath | Mar. 7, 1939 |
| 2,184,145 | Lambert | Dec. 19, 1939 |
| 2,314,614 | Fischer | Mar. 23, 1943 |
| 2,318,994 | Helmboth | May 11, 1943 |
| 2,328,277 | Hunt | Aug. 31, 1943 |
| 2,354,882 | Samann | Aug. 1, 1944 |

FOREIGN PATENTS

| Number | Country | Date |
|---|---|---|
| 103,639 | Germany | June 20, 1899 |
| 127,050 | Great Britain | May 29, 1919 |
| 528,155 | Great Britain | Oct. 23, 1940 |